United States Patent [19]

Starr

[11] 3,881,907
[45] May 6, 1975

[54] METHOD OF TEMPERING GLASS SHEETS
[75] Inventor: Eugene W. Starr, Allison Park, Pa.
[73] Assignee: PPG Industries, Inc., Pittsburgh, Pa.
[22] Filed: Jan. 30, 1974
[21] Appl. No.: 438,070

[52] U.S. Cl. ............... 65/114; 65/25 A; 65/104; 65/351
[51] Int. Cl. ............................................ C03b 27/00
[58] Field of Search ............ 65/104, 114, 348, 349, 65/350, 351, 337, 346, 335, 356, 182, A, 25 A; 62/5

[56] References Cited
UNITED STATES PATENTS

| 3,057,166 | 10/1962 | Thompson | 62/5 |
| 3,223,500 | 12/1965 | Misson | 65/182 A |

*Primary Examiner*—Arthur D. Kellogg
*Attorney, Agent, or Firm*—Edward I. Mates; Thomas F. Shanahan

[57] ABSTRACT

The present invention relates to the heat treatment of glass and incorporates in glass cooling apparatus one or more vortex tubes that separate pressurized gas used to cool heated glass sheets into hot and cold components in such a manner that the cold component of the incoming gas is directed to contact a glass sheet surface and the hot component is directed away from the glass surface. In a preferred embodiment of the invention, the cold component traverses the interior of one or more modules disposed in sufficiently close adjacency to the glass surface to enable the module to cool the glass by radiation cooling while the cold component cools the glass on contact.

2 Claims, 7 Drawing Figures

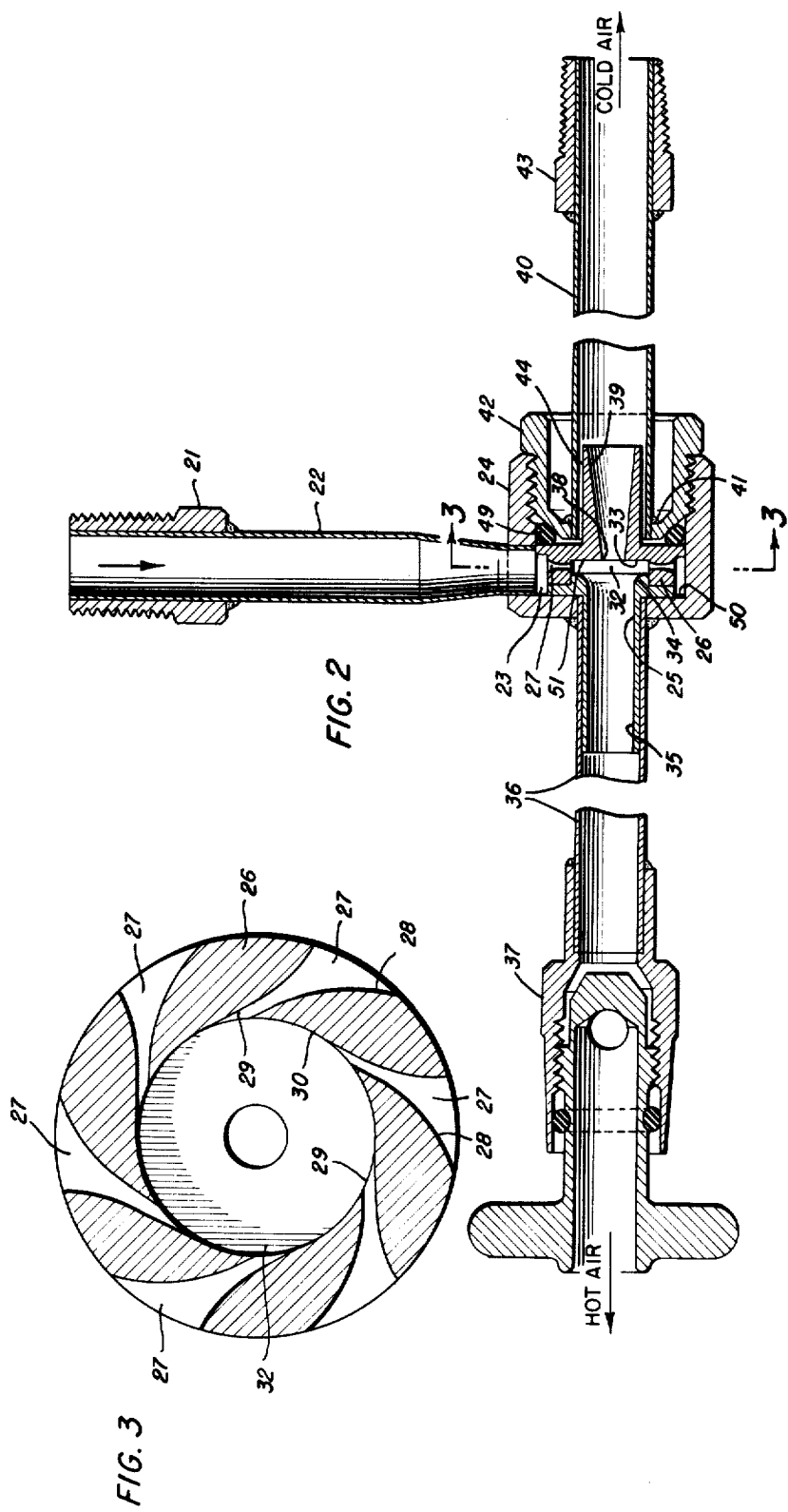

METHOD OF TEMPERING GLASS SHEETS

BACKGROUND OF THE INVENTION

The present invention relates to the cooling of heated glass sheets. When glass sheets are tempered or heat-strengthened, it is necessary to heat the glass sheet to a temperature above that at which its contour is changed by a deformation stress on contact with solid members. Where it is desired to strengthen the glass sheets, it is further necessary to rapidly cool the glass sheets from such a deformation temperature to a lower temperature below the annealing range of the glass. The effectiveness of such strengthening is improved by an increase in the rate at which heat is removed from the glass sheet surfaces compared to the rate of heat removal from the center of the glass sheet.

Economic use of fabrication equipment requires conveying treated glass sheets while the latter are hot. The need to convey glass at high temperatures has resulted in undesirable deformation or marring of the major glass sheet surfaces due to physical contact with support and conveying apparatus while the glass is at elevated temperatures.

Efficient tempering with a minimum of deformation or marring of the major surface of glass sheets undergoing treatment requires that the glass surface be cooled as rapidly as possible after the glass attains its elevated temperature sufficient for tempering. The use of air blasts through a series of nozzle openings provided along walls of plenum chambers facing a predetermined path along which glass sheets travel has been combined with rapid movement of glass sheets past the series of nozzle openings to provide air blasts that chill the surfaces relatively rapidly while the interior cools at a less rapid rate. Standard production equipment is limited in the rate of air it provides and provides air blasts at temperature approximating the ambient conditions.

Glass is known to be strong in compression and weak in tension. Tempering glass increases the compression stress at the surface, thus increasing the resistance of tempered glass to impact compared to untempered glass. Furthermore, in the less frequent times that tempered glass fractures on impact, it forms smaller fragments that are less harmful than the relatively large fragments having jagged edges that result when untempered glass is broken.

It would be beneficial to be able to improve existing glass tempering equipment to enable it to develop increased compression stress at the glass surface while avoiding optical distortion at the surface without scrapping previously existing tempering equipment.

SUMMARY OF THE INVENTION

The present invention accelerates the initial cooling of the surface of glass sheets leaving a furnace where they are heated to deformation temperature so that the glass surface is hardened at least for sufficient time to minimize surface deformation before the onset of the more conventional air quenching blasts. Cooling of the glass sheets having surfaces at least temporarily hardened is continued using the more traditional cooling technique until the glass is cooled to below its strain point throughout its extent.

According to preferred embodiments of the present invention, at least one row of modules constructed to have good heat-exchange properties is provided to face the path of movement of glass sheets immediately beyond the exit of a furnace used to heat a series of glass sheets moving therethrough to an elevated temperature sufficient for tempering. One or more vortex tubes is provided for each row of modules to receive gas under pressure, to separate the gas into a cold component and a hot component, to direct the cold component into one or more distributor chambers and thence through said modules facing the surface of a heat-softened glass sheet along a line extending transverse to the path of glass sheet movement. The cold component of the gas is thus directed into contact with the moving glass sheets immediately after they leave the furnace. A preferred type of module is one that provides turbulent flow of cold gas against a narrow line of the glass that passes in facing relation to the row of modules, is of a metal that does not react with the cold component of the gas and is cooled by said cold component so that it helps cool the adjacent surface of the moving glass by radiation cooling when the glass sheet passes thereby in closely spaced relation to said module row.

The vortex tube directs the hot air component away from the path taken by the glass and may be channeled to wherever hot air is desired.

The vortex tubes that are used to separate incoming gas blasts into a cold component that is delivered into contact against the glass surface and a hot component that is delivered away from the glass surface are preferably of the counterflow type resembling a T fitted with pipes on either side such as the type disclosed in U.S. Pat. No. 3,173,273 to Fulton. Compressed air is fed into the stem of the T into a generator which separates the flow into a hot component which leaves the vortex tube in one direction along one pipe and a cold component which is directed through said other pipe toward the modules associated with said vortex tube.

The counterflow vortex tube comprises a long, slender tube with a diaphragm closing one end of the tube and a small hole in the center of the diaphragm, one or more tangential nozzles piercing the tube just inside the diaphragm, and a throttling valve at the far end of the slender tube. The function of the counterflow vortex tube is to receive a flow of compressed gas through the nozzles and to discharge a stream of cold, expanded gas through the small hole in the diaphragm, and a stream of hot, expanded gas through the valve.

The modules used in the row of modules are preferably of the type depicted in FIGS. 10 to 14 of U.S. Pat. No. 3,223,500 to Misson and have a central passageway extending from a common distributor chamber to a fixed cap member at the surface facing the glass and are provided with a series of arcuate passageways extending from the central passageway through a restricted orifice formed by the fixed cap member to a series of coplanar arcuate grooves. Cold gas traveling from the cold outlet tube of the vortex tube through the distributor chamber and thence through the central passages from the distributor chamber to the surface facing the adjacent surface of a heated glass sheet forms a pressurized bed that exerts a force against each glass sheet in succession. Turbulent flow is created by the constantly changing direction of gas movement caused by the arcuate path of the surface grooves as well as by the velocity increase caused by flowing from the central passageway through the restricted openings and additional velocity increase into the arcuate grooves and the additional velocity increase caused by flows from the grooves, across their edges and into the space between the glass and the module surface. The result is an extremely high rate of heat transfer between the glass sheets and the flowing gas.

The modules in the single row may be opposed by a corresponding set of closely spaced modules facing the opposite surface of the glass sheets from that faced by the one row of modules. The modules in each row are abutted against one another to provide a continuous line source of radiation cooling. Exhaust passages are provided at opposite sides of the row of modules so as to assure a substantially uniform pressure in the space between each glass surface and the surface of the row of modules facing the glass surface. In an alternative embodiment, the modules of each set are spaced a slight distance from one another to provide exhaust passages between adjacent modules in the manner described in detail in U.S. Pat. No. 3,223,500 to Misson.

The details of the structure and operation of the vortex tubes recited in U.S. Pat. No. 3,173,273 to Fulton and the details of the structure and operation of the modules recited in U.S. Pat. No. 3,223,500 to Misson are incorporated by reference in the present application.

The present invention represents the first time that vortex tubes have been incorporated in glass cooling apparatus and particularly in combination with gas supply modules capable of superior heat exchange properties, and will be better understood in the light of a description of an illustrative preferred embodiment and variations thereof. In the drawings which form part of the description of the preferred embodiments, like reference numbers are used in relation to like structural elements.

BRIEF DESCRIPTION OF THE DRAWINGS

In the drawings,

FIG. 2 is an enlarged longitudinal sectional view, with portions of outlet tubes removed, showing the structural arrangement of a vortex tube;

FIG. 3 is a greatly enlarged transverse section of a vortex generator forming part of the vortex tube of FIG. 2 and taken along the lines of 3 — 3 of FIG. 2;

DESCRIPTION OF THE PREFERRED EMBODIMENTS

Figure 1:
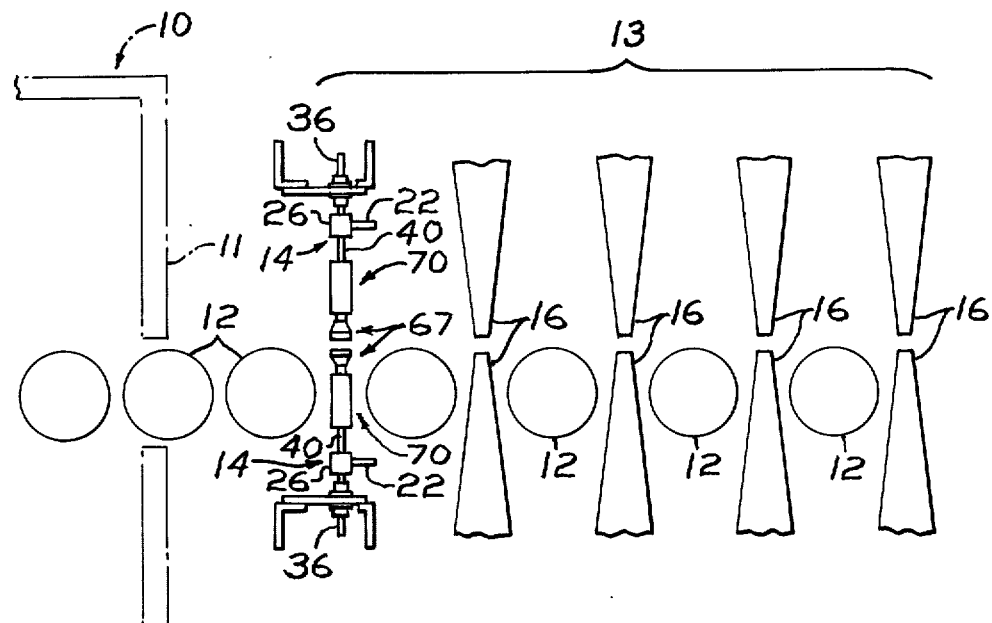
FIG. 1 is a schematic longitudinal elevational view of a portion of a roller conveyor disclosing how a row of modules communicating with the outlet end of the cold tube of a vortex tube system is incorporated in a horizontal glass tempering line.
Figure 4:
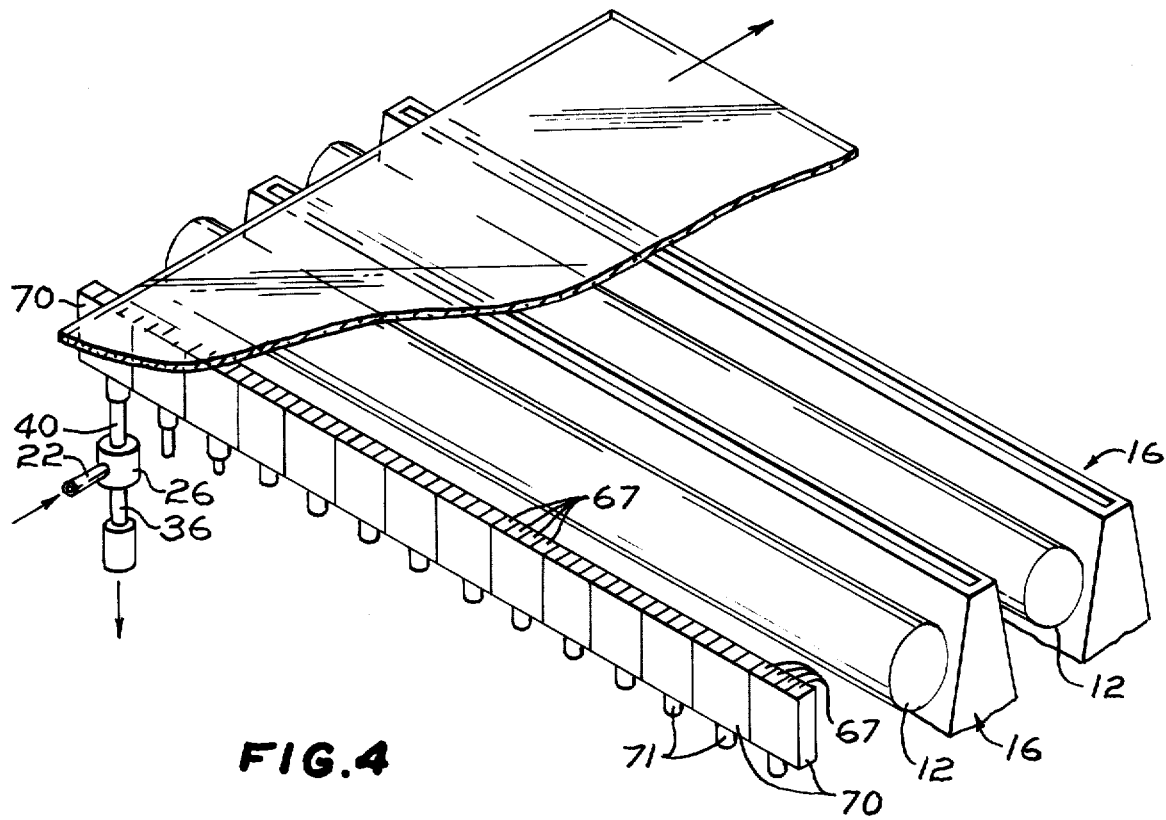
FIG. 4 is a schematic, fragmentary perspective view of the lower portion of the apparatus of FIG. 1 showing how a row of rosette modules is arranged in sets with individual distributor chambers and how each distributor chamber is connected to a vortex tube.

FIG. 1 shows a furnace 10 having an exit wall 11, and a series of conveyor rolls 12 that are spaced longitudinally to define a path of travel for a series of glass sheets extending through the furnace 10 and a cooling station 13. The conveyor rolls extend transversely of said path in longitudinally spaced relation therealong. Immediately beyond the furnace exit 11 and intermediate adjacent longitudinally spaced rolls 12, there is provided one or more rows of upper and lower vortex tubes 14. Each vortex tube communicates with a set of modules 67. Conventional elongated slot type nozzles 16 are arranged intermediate additional conveyor rolls 12 located subsequently along the path of travel. Nozzles 16 discharge streams of compressed air against the opposite surfaces of glass sheets after the latter are initially cooled by the cold gas component from vortex tubes 14 that is fed toward the glass sheet surfaces through the modules 67 as will be explained in detail later.

Referring to the drawings and more particularly to FIGS. 2 and 3, there is illustrated a counterflow vortex tube for the emission of cold and hot gas streams corresponding to given available gas pressures and flows and desired cold fractions. The construction illustrated is suitable for sizes ranging from the smallest possible unit to tube diameters of 1 inch or more. Compressed gas from a compressor is introduced through a fitting 21 and inlet tube 22 into an annular plenum chamber 23 formed between a body 24 and an insert 25 having a diverging throat and generator 26. Plenum 23 distributes the gas, still under full pressure, to a plurality of circumferentially spaced-apart tangential nozzles 27 formed in the generator 26 as more fully shown in FIG. 3. The vortex generator 26 is a body of revolution except for nozzles 27.

FIG. 3 presents a section of the generator 26 through the midplane of nozzles 27 with each nozzle constituting a cavity of revolution consisting of a tapering, inwardly converging inlet section 28 merging into a straight, round passageway, aperture or hole 29 intersecting the round cylindrical inner surface 30 of the vortex generator. Nozzles 27 are so positioned in vortex generator 26 that the outermost elements of straight portions 29 are approximately tangent to cylindrical surface 30. In order to obtain optimum results, these elements should not reside outside of the tangent to surface 30 in order that there will not be created a step or indentation where portions 29 terminate and surface 30 resumes. It is permissible that the outermost elements be slightly inside of the tangent to surface 30.

The function of nozzles 27 is to accelerate the gas to the maximum possible velocity, which is sonic velocity, and to inject the gas tangentially into an outer vortex chamber 32. The inlet or mouth of each nozzle should be not less than three times as wide as throat portion 29. The contour of section 28 should be smooth and polished and should merge gradually into portion 29, which should be smooth and highly polished. The design of the nozzles follows well-known best practices in the design of converging nozzles for any fluid.

The high-speed jets of gas emerging from the nozzles enter chamber 32 and create therein an intense vortex or rapidly revolving gas mass. In small vortex tubes this mass revolves at 1 million revolutions per minute or more. Chamber 32 may be referred to as the outer-vortex chamber, the adapting chamber, the free-vortex chamber, the supersonic chamber, or the impedance-matching chamber. The specification of chamber 32 is that it is a narrow annular cavity surrounding, larger than, and merging into the long, principal vortex cavity or tube of the vortex tube. The axial width of chamber 32 is preferably made from 1½ to 2 times the axial width of nozzle throats 29. It can be made slightly wider without a substantial loss in performance provided that the flat surface 33 which terminates the vortex chamber on the cold end is located closely adjacent to the nozzle throats 29. The preferred outer diameter of chamber 32, that is, the diameter of the cylindrical cavity 30, depends upon the absolute pressure ratio applied to the vortex tube as will be hereinafter described.

The narrowness of chamber 32 causes the air to spiral promptly inward therein and generate large Coriolis forces which speed it up. This establishes a substantially free vortex in chamber 32 and augments the entering sonic velocity efficiently to supersonic. In a free vortex, angular momentum is conserved and velocity is inversely proportional to radius. The supersonic air then enters the main, forced vortex and drives it at the maximum possible speed. The minimum diameter of chamber 32 required to accomplish this function for any given operating pressure ratio can be computed by those highly skilled in the art.

The shape of contour 34 merges chamber 32 into the bore 35 of insert 25. A circular radius such as shown in FIG. 2 is satisfactory. It is not usually advisable that this radius be the largest possible radius that will produce a 90° corner; the radius is ordinarily made somewhat smaller so that a planar surface exists in the outer portion of chamber 32.

The purpose of bore 35 is to adapt the generator and vortex to a hot tube 36 having a greater diameter and flow capacity than may correspond to the design of generator 26. By this means, a range of flow capacities may be covered in a single vortex-tube assembly by installing a series of alternate inserts 25 and generators 26 of various capacities. This substitution results in interchangeability of parts for producing the various desired results and increaes the flexibility, adaptability, aand economy of the vortex tube in its application to useful purposes.

A valve 37 mounted at the terminal end of tube 36 may ordinarily be of any convenient design and may be made alternatively in the form of a fixed orifice, porous plug, capillary tube, or any means that will create a sufficient obstruction to force the desired fraction of gas out of the opposite end of the vortex tube. It is likely, however, that by making tube 36 at least 20 times as long as the diameter of bore 35 in insert 25, optimum results will always be closely approached if not fully attained. When tube 36 is long, valve 37 plays the role only of a resistance, and the only effect of importance at the extremity of tube 36 is the control of the amount of gas permitted to depart therefrom.

The inside surfaces of all parts, the insert 25, the vortex generator 26, and the long tube 36 should be smooth, round and highly polished. The degree of smoothness and polish required in the tube 36 decreases toward the valve end and becomes unimportant at that location.

A portion of the gas flows out through an orifice 38. The diameter of orifice 38 is critical and must be determined by experiment for each operating condition. For the production of small cold fractions, it should be less than one-half the inside diameter of insert 25. For large cold fractions, the optimum is larger than one-half the diameter of bore 35. The optimum shape of the corner where surface 33 intersects orifice 38 is difficult to determine and depends somewhat upon the operating conditions and particularly upon the moisture content of the gas since deposition of ice occurs there. Under some conditions, a sharp edge is best. Under others, a small radius is best. Under still other conditions, a small snout or re-entrant mouth is best. It is advisable to investigate the effect of the shape of this corner with respect to the particular operating conditions desired.

Upon passing through orifice 38, the cold gas enters a diffuser 39 in the form of a divergent cone, which serves two functions. Its first function is to convert the kinetic energy of the gas flowing through orifice 38 into pressure, thus enabling the gas to flow into cold tube 40 more readily. This diffuser 39 lowers the pressure in the vortex core, at any given cold fraction, and enables colder gas to be produced. It also permits a smaller orifice 38 to be employed for the production of a given cold fraction with the result that colder gas is selected from the vortex core. This diffusing function is well known in fluid mechanics. The combination of vortex, orifice, and diffuser constitutes a Venturi tube. It is useful and effective primarily at high cold fractions where the velocity in the orifice is high and there is much kinetic energy to be converted. In order to perform the diffusing function most effectively, the divergent cone of the diffuser 39 should have a total included angle of between 8° and 16°. However, a preferred value is approximately 14°.

The second function of the diffuser 39 is to insulate the cold gas from the warm portion of cold tube 40 where it joins a counterbored cap 42. Vortex tubes have previously suffered from warming of the cold gas in this region before the gas could reach the distant and well insulated portions of cold tube 40. This warming has been particularly severe at small cold fractions where there is so little cold gas that the acquisition of a small amount of heat warms it by many degrees. But this is just the condition at which the coldest gas is internally produced. The result was that the coldest possible gas was never obtained. As the cold fraction was reduced, the cold gas temperature in tube 40 passed through a minimum in the range of 20 percent to 30 percent cold fraction and then rose rapidly at smaller cold fractions. This was entirely due to heat flow into the cold gas from the warm parts which it touched on its way out.

This defect is almost completely overcome by joining the combination of the diffuser 39 with the thin cold tube 40 to the counterbored cap 42 only at a recessed juncture 41. The cold gas never touches warm portion. The portion of tube 40 where diffuser 39 ends and releases the gas is at a distance from warm portion 41 and is joined to it only by the thin section of the tube wall which conducts very little heat. The requisite strength and insulating factors of this design for tube 40 result in improving the insulating feature for achieving minimum temperature of the cold gas measured well downstream in tube 40 and even inside a fitting 43. This occurs at cold fractions of 10 percent or less and is decidedly lower than that which has been achieved heretofore. An annular air space 44 between the outside of diffuser 39 and the inside of tube 40 provides increased insulating characteristics.

Cap 42 is provided with a male screw thread which engages a female screw thread in the body 24. The inner end of the cap 42 is provided with a conical surface which engages an O-ring 49. O-ring 49 is of the type commonly known in the mechanical art and is preferably composed of synthetic rubber. O-ring 49 performs a simultaneous radial and axial seal of all the parts and prevents the passage of gas in any direction in its neighborhood. It also simultaneously exerts a forward axial pressure upon the generator 26 so as to seat it against the insert 25 and to seat the insert 25 against the body 24 at a flat surface 50. It is ordinarily sufficient to tighten cap 42 by hand whereupon a gas pressure of up to 200 p.s.i.g. can be admitted to the inlet tube 22 without leakage. For still higher pressures or for permanence and rigidity of assembly, the cap 42 may be tightened by suitable means until it seats tightly against the lip of body 24. In order that O-ring 49 will not be excessively compressed, the axial lengths of all parts are preferably so made that when cap 42 is tightly threaded, the compression of O-ring 49 is of the maximum tolerable amount.

The body 24 and cap 42 are preferably made of brass, steel, stainless steel, monel, or any other desirable metals or may be made of plastic materials in some applications. The tubes 22, 36 and 40 are preferably made of stainless steel due to its low heat conductivity and high strength factors. The joints where the tubes 22, 36 and 40 are joined to the body 24 and cap 42 are preferably brazed or welded for high strength. However, they may be soft-soldered, glued, or fitted with screw threads when desirable. Insert 25 may be made of any desirable material whether of metal or plastic.

The material bounding surface 51, orifice 38 and diffuser 39 is preferably a plastic due to its very low heat conductivity, which will produce a minimum of adverse heat conduction into the cold gas as it rubs on surface 51, orifice 38 and diffuser 39. The use of a thermoplastic material will permit employment of the mandrel-type of molding in forming orifice 38 and diffuser 39 in a manner similar to that described for forming nozzles 27 in the generator, provided, however, that the molding and mandrel is of the proper contour to form the diffuser and orifice contours desired. In the event the nozzle-containing portion of generator 26 is made of metal, it is still desirable that surface 51, orifice 38 and diffuser 39 be formed in plastic for its insulating characteristics.

The improved vortex tube that has been described and appears in the various figures, when supplied with dehumidified compressed air at 70° F. and 100 p.s.i.g. and discharging at atmospheric pressure, will produce a small fraction of cold air at minus 50°F. or below when tube 36 is one-fourth inch in diameter and the capacity is between 4 c.f.m. and 8 c.f.m. When tube 36 is one-half inch in diameter and the capacity is 16 c.f.m. to 32 c.f.m., a temperature of minus 60° F. or below is produced. At 50 percent cold fraction, the same respective vortex tubes will produce minus 15° F. or below and minus 22° F. or below.

The vortex tubes 14 are arranged so that the cold tube 40 of each vortex tube communicates with a common distributor chamber 70 to supply cold pressurized gas thereinto. Each chamber 70 is provided in its wall facing the path of glass sheet movement with either a slot opening or a series of modules 67 along a row extending transverse to the path of glass movement so that cold gas contacts the surface of the moving glass sheets to initially cool the glass surfaces near the furnace exit 11. While conventional air supply nozzles 16 are shown in position to provide additional cooling air along spaced transverse rows beyond the row of modules or nozzles through which the cold gas component is supplied, the apparatus may comprise as many rows of modules or nozzles communicating in like manner with the vortex tubes as desired.

Figure 6:
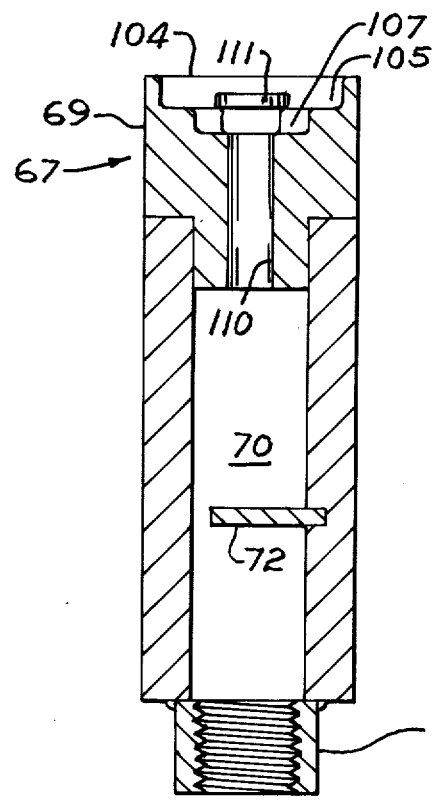
FIG. 6 is a fragmentary elevational view taken along the line of VI — VI of FIG. 5.
Figure 7:
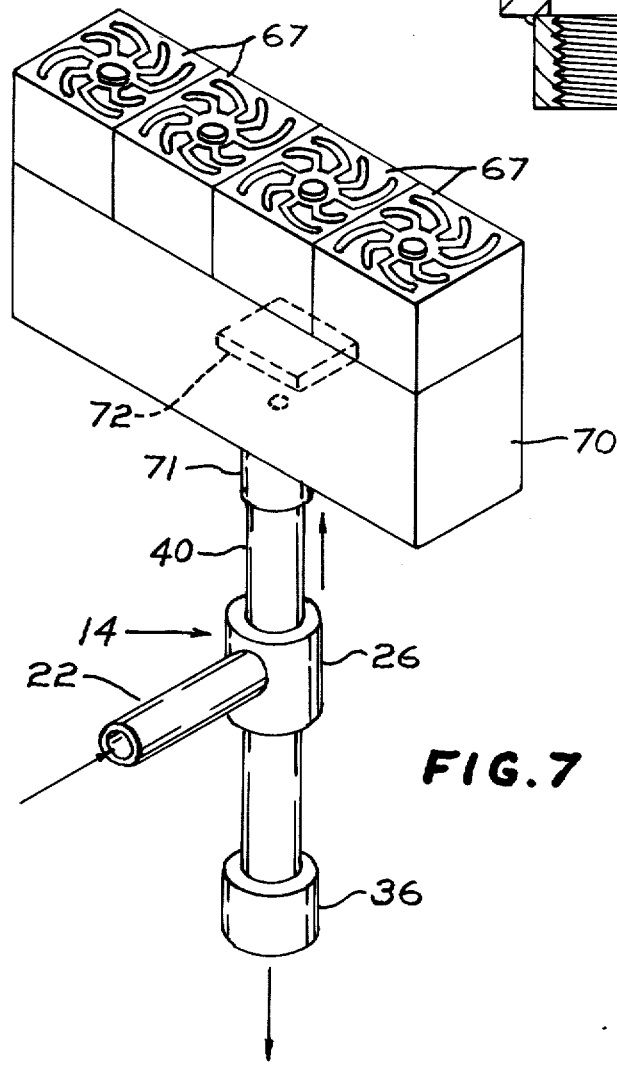
FIG. 7 is an enlarged, schematic perspective view showing the relation of a lower set of modules and a common distributor chamber for said modules to the cold tube of a vortex tube.

Each cold tube 40 has its fitting 43 screwed into a boss 71 in a wall of a selected distribution chamber 70 spaced from the wall of the chamber that faces the path of glass sheet movement, as shown in FIG. 6. A small baffle plate 72 is axially aligned with each boss 71 within chamber 70. A series of distribution chambers 70 extends in end to end relation to form a row. Each distribution chamber provides pressurized air to a set of modules 67. The latter are preferably of square or rectangular cross-section in plan and are arranged to face a corresponding surface of moving glass sheets as the latter move beyond the furnace 10 along the path of glass sheet movement.

Figure 5:
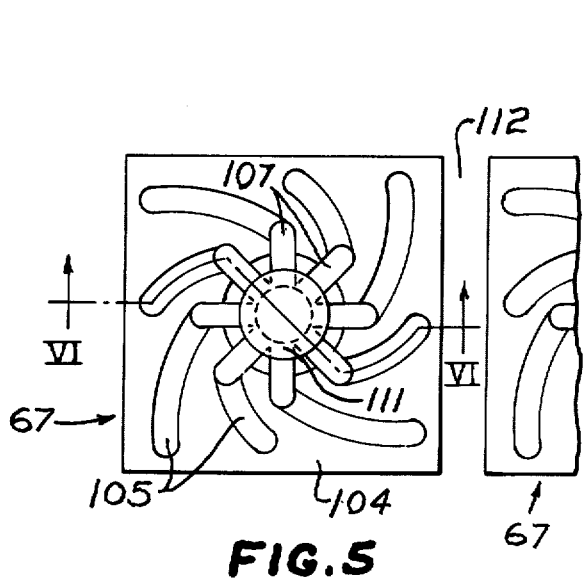
FIG. 5 is a plan view of a glass facing surface of a portion of a set of rosette modules.

FIGS. 5 and 6 illustrate an embodiment of a module which has a particularly high heat transfer rate. The module is most advantageously suited for use in quenching a heated sheet of glass to produce a very high degree of temper therein while still preserving the surface uniformity and optical characteristics of the heated glass sheet.

Each module 67 includes a stem 68 and an axially aligned body portion 69 having an end surface or, in the position of the module shown in FIGS. 5 and 6, an upper surface 104 of generally rectangular configuration. The latter contains a plurality of coplanar, arcuate grooves 105 (FIG. 5) extending outwardly from a central part of the module at which location each groove communicates through a radial portion 107 with a central passageway 110 extending through the stem 68 and communicating with the distributor chamber 70 at its end away from surface 104. A fixed cap member 111 cooperates with radial groove portions 107 and central passageway 110 to form a restrictive orifice for each groove 105. With this arrangement, cold gas from cold tube 40 via the distributor chamber 70 is fed under pressure to the centermost portion of each arcuate subdivision of the module and flows along the arcuate subdivisions or grooves while escaping over the walls thereof and across the upper surface 104 of the module 67 to exhaust zones 112 that surround each module 67.

When the module is in close proximity to a sheet of material, the pressure of the gas within the grooves 105 and adjacent the surface 104 exerts a force against the sheet capable of supporting the same. Turbulent flow is created by the constantly changing direction of the gas molecules caused by the arcuate path of grooves 105 as well as by the velocity increase caused by flowing from the grooves, across the edges thereof and into the space between the glass and the module surface 104. The result is an extremely high rate of heat transfer between the adjacent sheet of material and the flowing gas.

Beyond the opposing pair of rows of modules 67 and intermediate adjacent additional conveyor rolls 12 in the cooling station 13, there are provided conventional upper and lower elongated slot nozzles 16, which are conventionally used in roller conveyor types of tempering apparatus. The slot nozzles extend transverse to the path of glass movement and provide openings for streams of tempering medium to impinge against the surfaces of glass sheets as the latter are conveyed through the cooling station 13.

It is well established that tempered glass resists fracture on impact better than untempered glass. An increase in surface compression stress increases the resistance to fracture of tempered glass. Experiments performed on glass sheets approximately 34 inches wide, 76 inches long and having nominal thicknesses of three-sixteenth inch (4.5 mm) and one-fourth inch (6 mm) heated to a range of 1240° to 1250°F. and then cooled showed an average increase of about seven percent in surface compression stress for glass sheets tempered using a row of modules fed by the cold tube of a vortex tube provided with a generator to separate the cold component from the hot component followed by a conventional quench containing a plurality of slot nozzles compared to the same system wherein the modules were fed at the same rate of air flow at ambient temperature. The cold components were provided at the same time of air flow as the ambient flows, but were in a temperature range of 24° to 45°F. compared to 69° to 74°F. for the flows at ambient temperature.

An instrument known as a Differential Surface Refractometer, described in ISA Transactions, Volume 4, Number 4, Oct. 1965, was used to measure surface compression stress of these test samples.

In the experiments, glass sheets 34 inches wide by 76 inches long and 0.186 inch to 0.188 inch thick were conveyed on rotating conveyor rolls at a linear speed of 300 to 304 inches per minute through the furnace and cooling station so that they arrived at a position between the upper row of modules and the lower row of modules at a temperature ranging from 1240°F. to 1,250°F. The upper surface of the lower row of modules was 1/16 inch below the plane of support provided by the rotating conveyor rolls. The upper row of modules was disposed with its downward facing surface set at 13/32 inch above the upper surface of the lower row of modules. Air was supplied to the inlet tubes of the vortex tubes at 60 pounds per square inch for the upper row of modules and 20 pounds per square inch for the lower row of modules. Air blasted through the series of slot type nozzles was supplied to the upper plenum at a pressure of 11.5 ounces per square inch and to the lower plenum at a pressure of 9 ounces per square inch. The bottom slot openings were located in a horizontal plane 1¾ inches below the plane of support for the glass sheets provided by the rotating conveyor rolls and the upper slot openings were located in a horizontal plane 3 inches above the plane in which the bottom slot openings were located.

Average surface compression measurements with the Differential Surface Refractometer increased by 1,040 pounds per square inch for the top surface and 1,150 pounds per square inch for the bottom surface of glass sheets when the tempering apparatus was used with air flow to a row of modules using a generator compared to the same flow of air through the modules using no generator and wherein all other parameters such as line speed, air pressure for the slot nozzles, etc. remained the same as evidenced by the following table comparing average stress values with and without the benefit of the vortex tube booster.

COMPARISON OF AVERAGE COMPRESSIVE STRESS OBTAINED WITH AND WITHOUT VORTEX TUBE BOOSTER

|  | Stress With Booster | Stress Without Booster | Stress Increase |
| --- | --- | --- | --- |
| Top Surface | 15,140 PSI | 14,100 PSI | 1040 PSI |
| Bottom Surface | 14,930 PSI | 13,780 PSI | 1150 PSI |

Another measurement of the safety of tempered glass is the size of particles produced when tempered glass is fractured by penetration with a punch. The smaller the particles the safer is the glass. Using a row of modules supplying air at 24° to 45°F. from the cold tube of a vortex tube to initiate the quenching of hot glass having a nominal thickness of 3/16 inch (4.5 mm) followed by continued cooling through a plurality of spaced slot nozzles resulted in producing tempered glass which, when fractured by a spring loaded punch, had its 10 largest particles weighing an average of 42.2 grams compared with an average of 62.1 grams for the 10 largest particles of glass tempered using the same appartus except that air at 69° to 74°F. was supplied at the same rates of air flow through the modules and the inactivated vortex tubes with all other parameters identical.

The results of these experiments indicated that the use of a vortex tube with a vortex generator to supply a cold gas component to the glass surface through a row of modules improves the safety of tempered glass produced on otherwise conventional glass tempering apparatus because the addition of a row of modules supplying a cold gas component through a cold tube of a vortex tube resulted in higher compressive stresses at the glass surface and smaller sized particles when the tempered glass was fragmented than glass tempered by the same amount of air supplied at ambient temperature.

Since the modules are generally made of metal (aluminum and stainless steel being preferred materials), it is theorized that a certain amount of radiant cooling as well as convection cooling takes place when a glass sheet passes in facing relation to a row of modules. This radiant cooling is much more uniform from end to end of a row of modules than is possible to obtain from convection cooling developed from exposure to cold gas flow alone supplied through conventional slot-type nozzles or nozzles of cylindrical configuration. Hence, a glass sheet, on leaving a furnace, is less likely to develop an irridescent pattern that results from non-uniform cooling of the glass surface, when it is exposed to a line of radiation cooling provided by a row of modules.

The continuous flow of cold gas from the cold tube of a vortex tube retards the tendency of the heated glass sheets that pass in close adjacency to the modules to heat the latter.

The apparatus described above may be used for tempering glass sheets of various widths. When narrow glass sheets are being processed, it is understood that only the vortex tubes 14 that supply cold gas to the common distributor chambers 70 whose modules face the width of the moving glass sheets need be provided with air under pressure.

The results of the experiments performed with roller conveyors have been so successful that vortex tubes have also been used with tempering modules in the cooling section of a so-called gas hearth operation of the type depicted in U.S. Pat. No. 3,223,500 to Misson. The introduction of vortex tubes in the gas hearth operation has been incredibly successful. Yields have increased by 3 to 5 percent mainly because the introduction of the vortex tube enabled the glass to be chilled more rapidly from the elevated temperature needed for tempering than was the case using modules without vortex tubes. As a result, irridescent patterns and other distortions formerly associated with tempering on the gas hearth were vastly improved and the optical properties of the glass surfaces were also improved considerably.

The following table indicates the parameters used in tempering glass sheets of different thicknesses using tempering apparatus provided with a row of modules connected so that a set of four modules each 1 inch square receives the cold component output of a vortex tube Model No. 208 provided with a No. 25 generator (supplied by Vortec Corporation) followed by a series of conventional slot type nozzles. The parameters are for glass sheets leaving a furnace at a temperature of 1,240°F. to 1,250°F.

In the table, the flow rate refers to air supplied at the module surface, the plenum pressure was measured in the plenum supplying air to the conventional slot nozzles and the air supply pressure refers to the air supplied to the inlet tube of the vortex tube.

| FLOW RATE (SCFM/IN²) | NOMINAL GLASS THICKNESS (INCH) | MODULE TO GLASS SPACING (INCH) | PLENUM PRESSURE (OUNCES/IN²) | MODULE TEMP. (°F.) | AIR SUPPLY PRESSURE (PSI) |
|---|---|---|---|---|---|
| 1 | ⅛ | .050 | 1.8 | 48 | 30 |
| 2 | 3/16 | .043 | 1.9 | 48 | 30 |
| 3 | ¼ | .039 | 2.0 | 48 | 30 |
| 1 | ⅛ | .080 | 7.8 | 25 | 67 |
| 2 | 3/16 | .067 | 8.0 | 25 | 67 |
| 3 | ¼ | .063 | 8.1 | 25 | 67 |
| 1 | ⅛ | .125 | 17.3 | 20 | 100 |
| 2 | 3/16 | .110 | 18.1 | 20 | 100 |
| 3 | ¼ | .087 | 18.9 | 20 | 100 |

It is not intended that the present invention be limited by the specific parameters enumerated. The latter are recited merely to set forth by way of example to enable those skilled in the art to practice this invention.

The form of the invention shown and described in this disclosure represents an illustrative preferred embodiment and certain modifications thereof. It is understood that various changes may be made without departing from the spirit of the invention as defined in the claimed subject matter that follows.

The present invention has enabled the continued use of preexisting tempering apparatus without requiring replacement of the existing compressed air system with a larger compressor system to supply air blasts at a greater rate of flow and/or higher pressure and/or the introduction of an expensive refrigerator system to supply the tempering medium at a lower temperature than before in order to improve the temper and the optical properties of glass articles fabricated on apparatus already available.

I claim:

1. A method of tempering a glass sheet comprising,
heating said glass sheet to an elevated temperature sufficient for tempering,
cooling a gas in a vortex tube,
supplying said cooled gas to a first stage of tempering,
conveying said heated glass sheet through said first stage of tempering,
cooling said heated glass sheet with said cooled gas as it traverses said first stage of tempering at a rate of flow sufficient to at least temporarily harden and increase the resistance of the surface of said sheet to deformation,
supplying additional tempering gas without cooling to a second stage of tempering that immediately follows said first stage, and
further cooling said glass sheet with said additional tempering gas as it traverses said second stage of tempering at a rate of flow and for a period of time sufficient to effect a tempered condition in said glass sheet.

2. A method as in claim 1, wherein said cooled gas traverses the interior of a module to cool the module while said cooled gas is directed into contact with said heated glass sheet and said glass sheet is conveyed past said module in close enough adjacency thereto for the module to help cool said glass sheet by radiation cooling.

* * * * *